US006327119B1

United States Patent
Barina et al.

(10) Patent No.: US 6,327,119 B1
(45) Date of Patent: Dec. 4, 2001

(54) INERTIAL LATCH FOR MOBILE DISC DRIVE

(75) Inventors: Jeffrey Gerard Barina, Loveland; Frederick Frank Kazmierczak, Erie; Robert Terry Haas; Michael Alan Maiers, both of Longmont, all of CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/470,923

(22) Filed: Dec. 22, 1999

Related U.S. Application Data (60) Provisional application No. 60/130,296, filed on Apr. 21, 1999.

(51) Int. Cl.[7] .............................. G11B 5/54; G11B 21/22
(52) U.S. Cl. .......................................................... 360/256.4
(58) Field of Search ........................... 360/256.4, 256, 360/254, 250, 240, FOR 205

(56) References Cited

U.S. PATENT DOCUMENTS

| 5,189,576 | 2/1993 | Morehouse et al. | 360/256.4 |
|---|---|---|---|
| 5,369,538 | 11/1994 | Moe et al. | 360/265.1 |
| 5,404,257 | 4/1995 | Alt | 360/256.4 |
| 5,528,437 | 6/1996 | Mastache | 360/256.4 |
| 5,612,842 | 3/1997 | Hickox et al. | 360/256.4 |
| 5,623,384 | 4/1997 | Hickox et al. | 360/256.4 |
| 5,694,271 | 12/1997 | Stefansky | 360/256.3 |
| 5,742,455 | 4/1998 | Boutaghou | 360/256.5 |
| 5,805,384 | 9/1998 | Bronshvatch et al. | 360/256 |
| 5,870,256 | 2/1999 | Khanna et al. | 360/256.4 |
| 5,875,075 | 2/1999 | Hickox | 360/256.4 |
| 5,877,922 | 3/1999 | Boutaghou | 360/256.5 |
| 6,028,746 | * 2/2000 | Matsumura | 360/256.4 |
| 6,163,440 | * 12/2000 | Takahashi et al. | 360/256.4 |
| 6,185,074 | * 2/2001 | Wang et al. | 360/256.4 |

FOREIGN PATENT DOCUMENTS

| 0 107 853 A2 | 10/1983 | (EP) . |
| WO 99/10880 | 3/1999 | (WO) . |

* cited by examiner

Primary Examiner—Robert S. Tupper
Assistant Examiner—Julie Anne Watko
(74) Attorney, Agent, or Firm—John R. Wahl; Merchant & Gould (57) ABSTRACT

An inertial latch apparatus for maintaining an actuator arm in a disc drive in a predetermined position has an elongated inertial beam member pivotally mounted in the disc drive for rotation in a plane parallel to the plane of rotation of the actuator arm and a latch member pivotally mounted in the disc drive for rotation between a disengaged position permitting movement of the actuator arm when the latch member is in the disengaged position and an engaged position in interference relation to a portion of the actuator arm to prevent movement of the actuator arm when the drive is subjected to an external shock load. The latch member rotates in only one direction in response to rotation of the beam member in either a clockwise or counterclockwise direction from a neutral position.

18 Claims, 9 Drawing Sheets

INERTIAL LATCH FOR MOBILE DISC DRIVE

RELATED APPLICATION

This application claims the benefit of priority of United States Provisional Patent Application Serial No. 60/130,296 entitled "INERTIAL LATCH FOR MOBILE DISC DRIVE", filed Apr. 21, 1999.

FIELD OF THE INVENTION

This application relates to magnetic disc drives and more particularly to a latch mechanism for restraining the actuator arm when subjected to shock loads in a de-energized state.

BACKGROUND OF THE INVENTION

Disc drives are data storage devices that store digital data in magnetic form on a rotating storage medium on a disc. Modern disc drives comprise one or more rigid discs that are coated with a magnetizable medium and mounted on the hub of a spindle motor for rotation at a constant high speed. Information is stored on the discs in a plurality of concentric circular tracks typically by an array of transducers ("heads") mounted to a radial actuator for movement of the heads relative to the discs. Each of the concentric tracks is generally divided into a plurality of separately addressable data sectors. The read/write transducer, e.g. a magnetoresistive read/write head, is used to transfer data between a desired track and an external environment. During a write operation, data is written onto the disc track and during a read operation the head senses the data previously written on the disc track and transfers the information to the external environment. Critical to both of these operations is the accurate locating of the head over the center of the desired track.

The heads are mounted via flexures at the ends of a plurality of actuator arms that project radially outward from the actuator body. The actuator body pivots about a shaft mounted to the disc drive housing at a position closely adjacent the outer extreme of the discs. The pivot shaft is parallel with the axis of rotation of the spindle motor and the discs, so that the heads move in a plane parallel with the surfaces of the discs.

Typically, such radial actuators employ a voice coil motor to position the heads with respect to the disc surfaces. The actuator voice coil motor includes a coil mounted on the side of the actuator body opposite the head arms so as to be immersed in the magnetic field of a magnetic circuit comprising one or more permanent magnets and magnetically permeable pole pieces. When controlled direct current (DC) is passed through the coil, an electromagnetic field is set up which interacts with the magnetic field of the magnetic circuit to cause the coil to move in accordance with the well-known Lorentz relationship. As the coil moves, the actuator body pivots about the pivot shaft and the heads move across the disc surfaces. The actuator thus allows the head to move back and forth in an arcuate fashion between an inner radius and an outer radius of the discs.

The actuator arm is driven by a control signal fed to the voice coil motor (VCM) at the rear end of the actuator arm. A servo system is used to sense the position of the actuator and control the movement of the head above the disc using servo signals read from a disc surface in the disc drive. The servo system relies on servo information stored on the disc. The signals from this information generally indicate the present position of the head with respect to the disc, i.e., the current track position. The servo system uses the sensed information to maintain head position or determine how to optimally move the head to a new position centered above a desired track. The servo system then delivers a control signal to the VCM to rotate the actuator to position the head over a desired new track or maintain the position over the desired current track.

In laptop computers, the disc drive must be extremely robust and capable of withstanding shocks and inertial loads due to constant, and often rough, user handling. For this reason, the actuator is typically "parked" with the heads located outboard of the discs and resting on a ramp which protects the heads and discs from adverse loadings. Also, the use of super smooth disc media does not permit the heads to be parked on the discs when the discs ar not rotating. The actuator is typically held in this position with the heads parked by a magnetic latch engaging the VCM molding. However, in mobile applications, such as laptops, due to power and design constraints, the magnetic latch may not be sufficient to positively retain the actuator in the desired position if the drive or entire computer is severely jostled or dropped. Thus it is desirable to provide a latch mechanism which can prevent unwanted actuator arm rotation in these events but which can fit within the cramped confines of a small disc drive housing.

SUMMARY OF THE INVENTION

Against this backdrop the present invention has been developed. The present invention is an inertial latching apparatus for disc drives and in particular small mobile computer drives, that automatically engages the actuator arm to prevent rotation from a parked or latched position due to external shock loads when the drive is de-energized and the actuator arm is in a parked position. In particular, the inertial latch of the invention is designed to engage the actuator arm primarily when the disc drive is subjected to a rotary shock load about an axis parallel to the actuator axis and could also be designed to be sensitive to linear shock loads. The latch engages regardless of the rotational direction of force applied to the drive, but only engages when the drive is subjected to an external inertial or shock load on the drive housing.

These and various other features as well as advantages which characterize the present invention will be apparent from a reading of the following detailed description of two exemplary embodiments and a review of the associated drawings.

DETAILED DESCRIPTION

Figure 1:
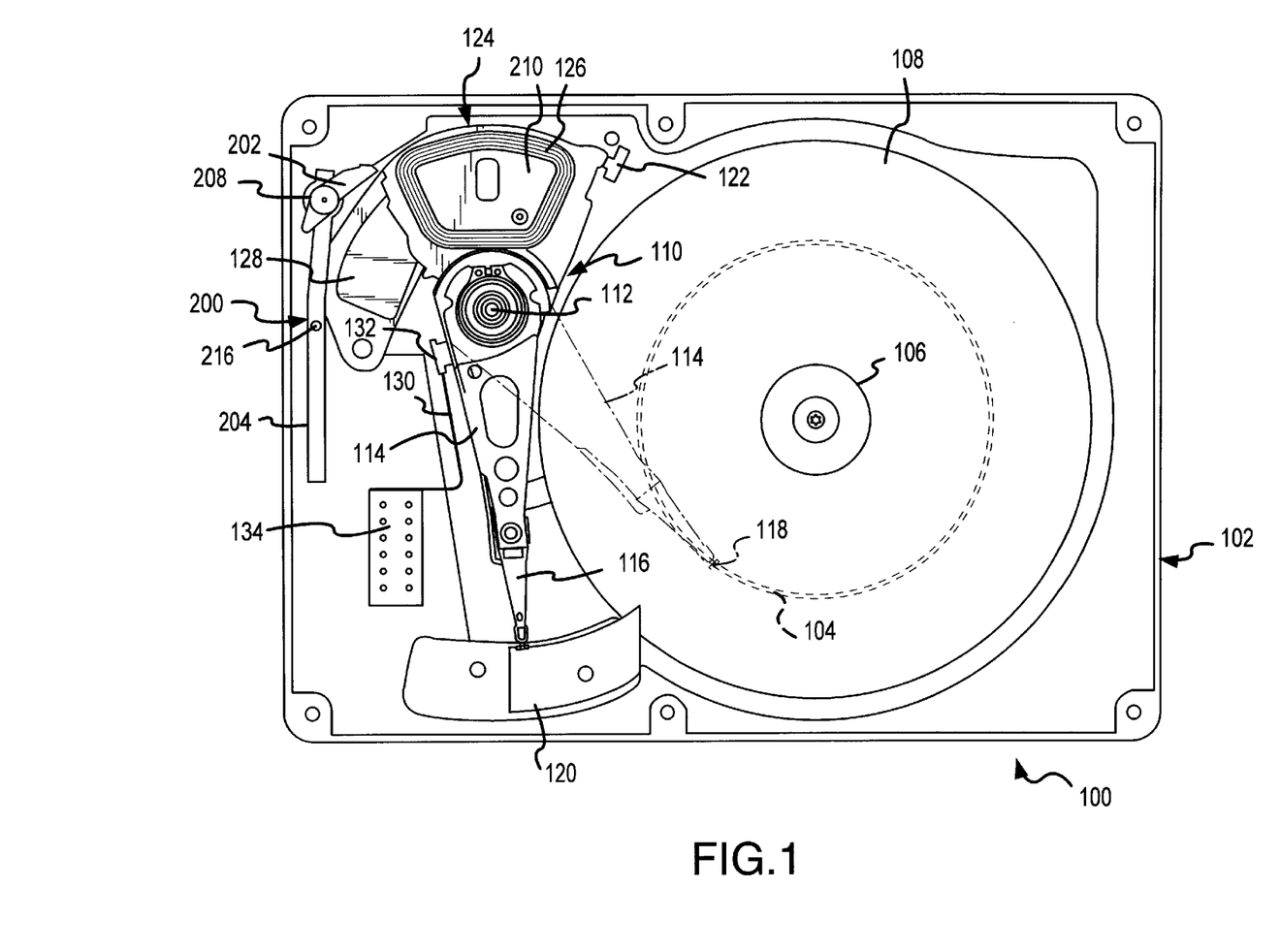
FIG. 1 is a plan view of a disc drive in accordance with a first preferred embodiment of the invention.

A mobile disc drive 100 having an inertial latch apparatus constructed in accordance with a first preferred embodiment of the present invention is shown in FIG. 1. The disc drive 100 includes a baseplate 102 to which various components of the disc drive 100 are mounted. A top cover (not shown) cooperates with the baseplate 102 to form an internal, sealed environment for the disc drive in a conventional manner. The major internal components include a spindle motor 106 which rotates one or more discs 108 at a constant high speed. Information is written to and read from tracks on the discs 108 through the use of an actuator assembly 110, positioned adjacent the discs 108. The actuator assembly 110 includes one or more actuator arms 114 which extend towards the discs 108 and which rotate together about a bearing shaft assembly 112, with one or more flexures 116 extending from each of the actuator arms 114. Mounted at the distal end of each of the flexures 116 is a head 118 which includes an air bearing slider enabling the head 118 to fly in close proximity above the corresponding surface of the associated disc 108.

The spindle motor 106 is typically de-energized when the disc drive 100 is not in use for extended periods of time. The actuator arms 114 are rotated clockwise from the position shown in dashed lines in FIG. 1 to move the heads 118 over and onto a ramp 120 to park positions off of the discs 108 when the spindle motor 106 is de-energized. The heads 118 are maintained on the ramp 120 in the park position through the use of an actuator latch arrangement, which prevents inadvertent rotation of the actuator arms 114 when the heads are parked. This latch arrangement is typically a magnetic latch which magnetically holds the actuator against a stop 122.

The radial position of the heads 118 during drive operation is controlled through the use of a voice coil motor (VCM) 124, part of the actuator assembly 110, which typically includes a coil 126 (shown in FIG. 2) attached to the actuator arm 114, as well as one or more stationary permanent magnets 128 which establish a magnetic field in which the coil 126 is immersed. The controlled application of current to the coil 126, positioned in this magnetic field, causes magnetic interaction between the permanent magnets 128 and the coil 126 so that the coil 126 moves in accordance with the well known Lorentz relationship. As the coil 126 moves, the actuator arms 114 rotate via the bearing shaft assembly 112 and the heads 118 are caused to move across the surfaces of the discs 108.

A flex assembly 130 provides the requisite electrical connection paths for the actuator assembly 110 while allowing pivotal movement of the actuator arms 114 during operation. The flex assembly includes a printed circuit board 132 fastened to the actuator to which head wires (not shown) are connected; the head wires being routed along the actuator arms 114 and the flexures 116 to the heads 118. The printed circuit board 132 typically includes circuitry for controlling the write currents applied to the heads 118 during a write operation and for amplifying read signals generated by the heads 118 during a read operation. The flex assembly terminates at a flex bracket 134 for communication through the baseplate 102 to a disc drive printed circuit board (not shown) mounted to the bottom side of the disc drive 100.

An inertial latch apparatus 200 in accordance with a first embodiment of the present invention is positioned alongside and between the actuator assembly 110 and the left end wall of the baseplate 102. The inertial latch apparatus 200 includes a latch member 202, an inertial beam 204, and a spring member 206, as is best shown in the enlarged partial plan views of FIGS. 2 through 4. Basically, the inertial latch 200 reacts to an environmental disturbance, e.g. an external shock load applied to the drive or the computer housing the drive, automatically. The latch member 202 is mounted for horizontal rotation about a vertical fixed pivot pin 208 which is preferably press fit or otherwise affixed to the baseplate 102 adjacent the actuator coil overmold 210. The beam 204, shown separately in FIG. 5, is an elongated strip of metal with a pivot hole 212 spaced from one end and a guide aperture 214 at the opposite end. The end of the beam 204 adjacent the guide aperture forms an engagement tab 215. The beam 204 is rotatably mounted on a stationary vertical beam pivot pin 216 also press fit or otherwise secured into the baseplate 102 along the left end wall of the baseplate 102. The guide aperture 214 fits loosely over the latch pivot pin 208 under the latch member 202.

Figure 6:
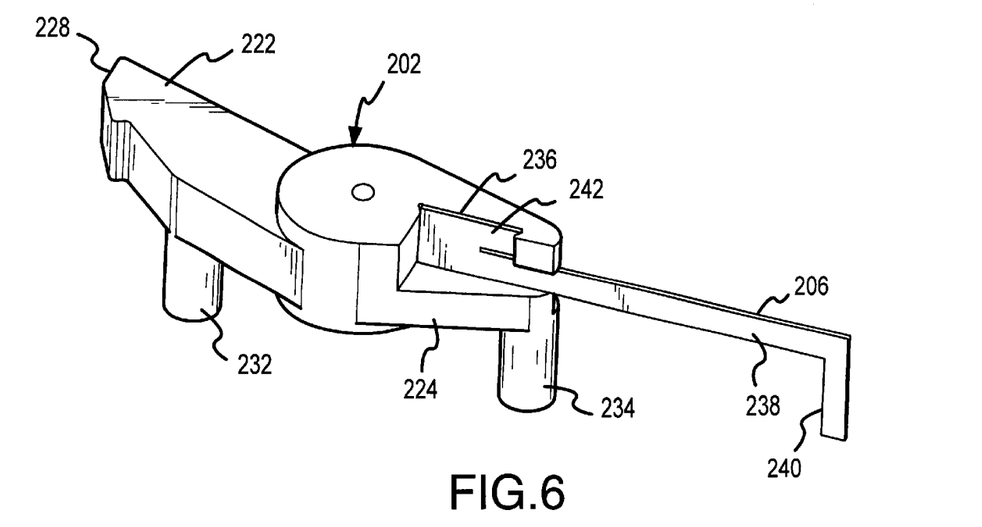
FIG. 6 is a separate perspective view of the latch member and spring bar of the latch apparatus in accordance with the first embodiment of the present invention.
Figure 7:
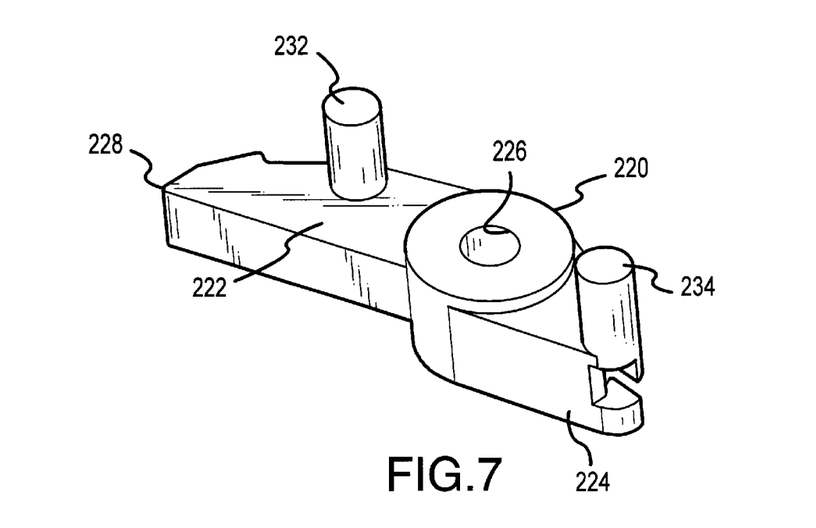
FIG. 7 is an upside down perspective view of the latch member shown in FIG. 6.
Figure 8:
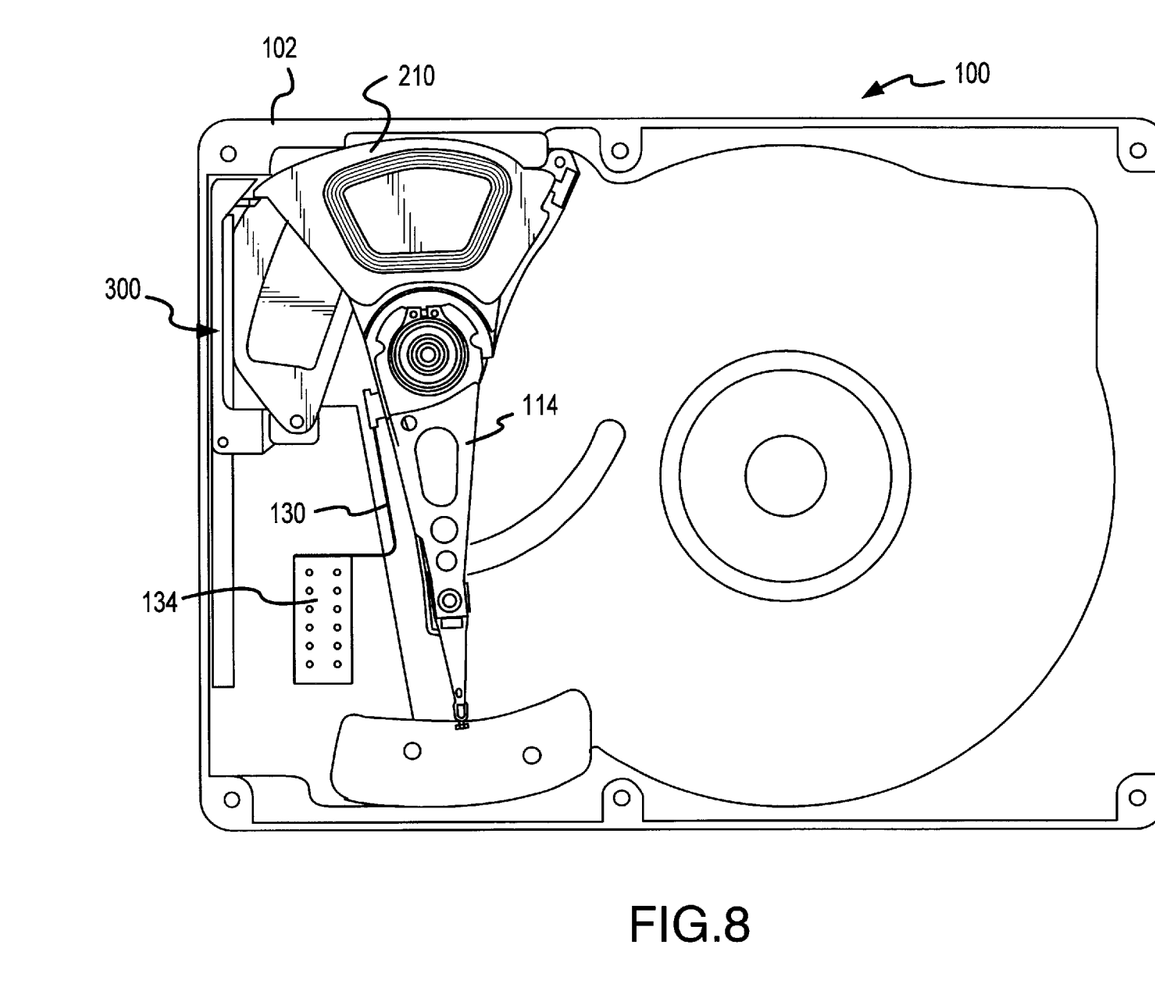
FIG. 8 is a plan view of a disc drive with the discs and spin motor removed showing an inertial latch apparatus in accordance with a second preferred embodiment of the present invention installed along the inner left side of the baseplate of the drive.

As can best be seen from FIGS. 6 and 7, the latch member 202 is an elongated body having a generally cylindrical central portion 220, an elongated latch portion 222, and a spring support portion 224 extending from the central portion 220 in a direction opposite to that of the latch portion 222. The central portion 220 has an axial bore 226 extending substantially all the way through the cylindrical central portion along its axis. This bore receives the pin 208 which rotatably supports the latch member 202. The latch portion is a generally flat body having a rectangular vertical cross section which extends from the central portion orthogonal to the axis of the bore 226 and has a latch tip 228 at its distal end for engaging a corresponding notch 230 in the coil overmold 210. This latch portion 222 also has a cylindrical peg 232 spaced from the bore 226 extending downward from the underside of the latch portion 222 in a direction parallel to the axis of the bore 226.

Similarly, the spring support portion 224 extends from the central portion 220 in a direction opposite to that of the latch portion 222. The support portion 224 also has a downwardly extending peg 234 extending parallel to and spaced from the central bore 226. The support portion 224 also has a vertical slot 236 for receiving one end of the spring member 206 as is shown in FIG. 6. This spring member 206 imparts a counterclockwise bias on the latch member 202 to position it as is shown in FIG. 2 during static conditions in which the drive is not under the influence of an external shock load.

The spring member 206, best shown in the perspective view of FIG. 6, is a generally "L" shaped flat piece of material such as a spring steel which has a long leg 238 and a short leg 240 extending from one end of the long leg 238 at a right angle to the long leg 238. The long leg 238 has a generally rectangular mounting tab portion 242 at the opposite end which is captured in the slot 236. As is best shown in FIGS. 2 through 4, the short leg 240 of the spring 206 presses against a feature in the inside end wall of the baseplate 102 and provides a counterclockwise bias on the latch member 202 during normal conditions.

Figure 2:
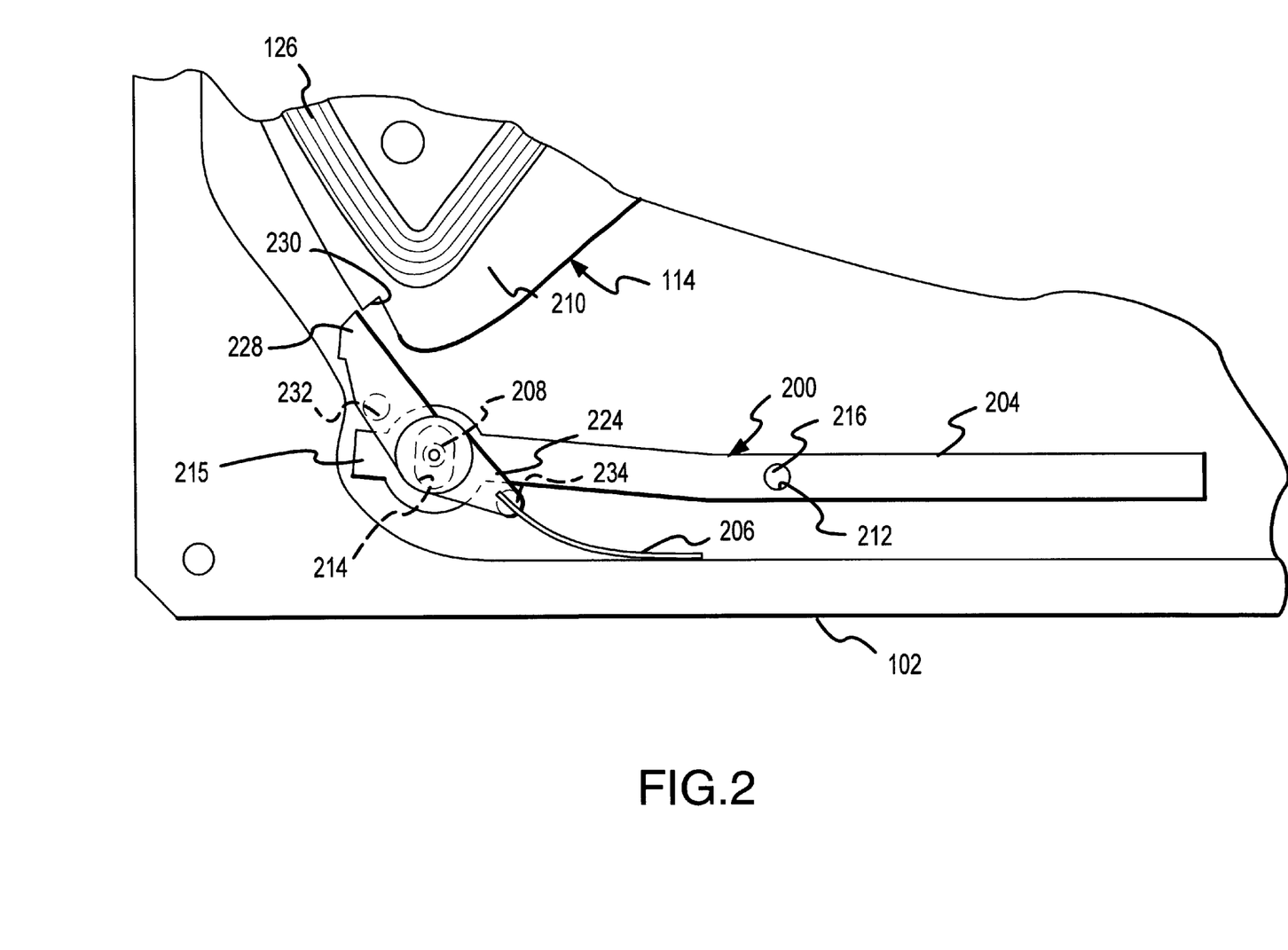
FIG. 2 is an enlarged partial plan view of the disc drive shown in FIG. 1 showing the orientation of a latch apparatus in accordance the first embodiment of the present invention when the drive is stationary.

Referring now specifically to FIG. 2, the assembled latch apparatus 200 in accordance with the first embodiment of the invention is shown during static conditions. The inertial beam pivots about the pin 216 and the guide aperture 214 is positioned over the latch pin 208. The latch member is installed over the inertial beam 204 such that the pegs 232 and 234 extend downward straddling the opposite sides of the beam 204 adjacent the aperture 214. In this position, the spring member 206 springingly engages a feature in the wall of the baseplate 102 to impart a counterclockwise rotational bias to the latch member 202. As such, the latch tip 228 is rotated out of the way of the notch 230 in the actuator coil overmold 210, thus permitting free rotation of the actuator arm 114 away from the parked position as shown in FIG. 1 to the exemplary position shown by dashed lines in FIG. 1.

Figure 3:
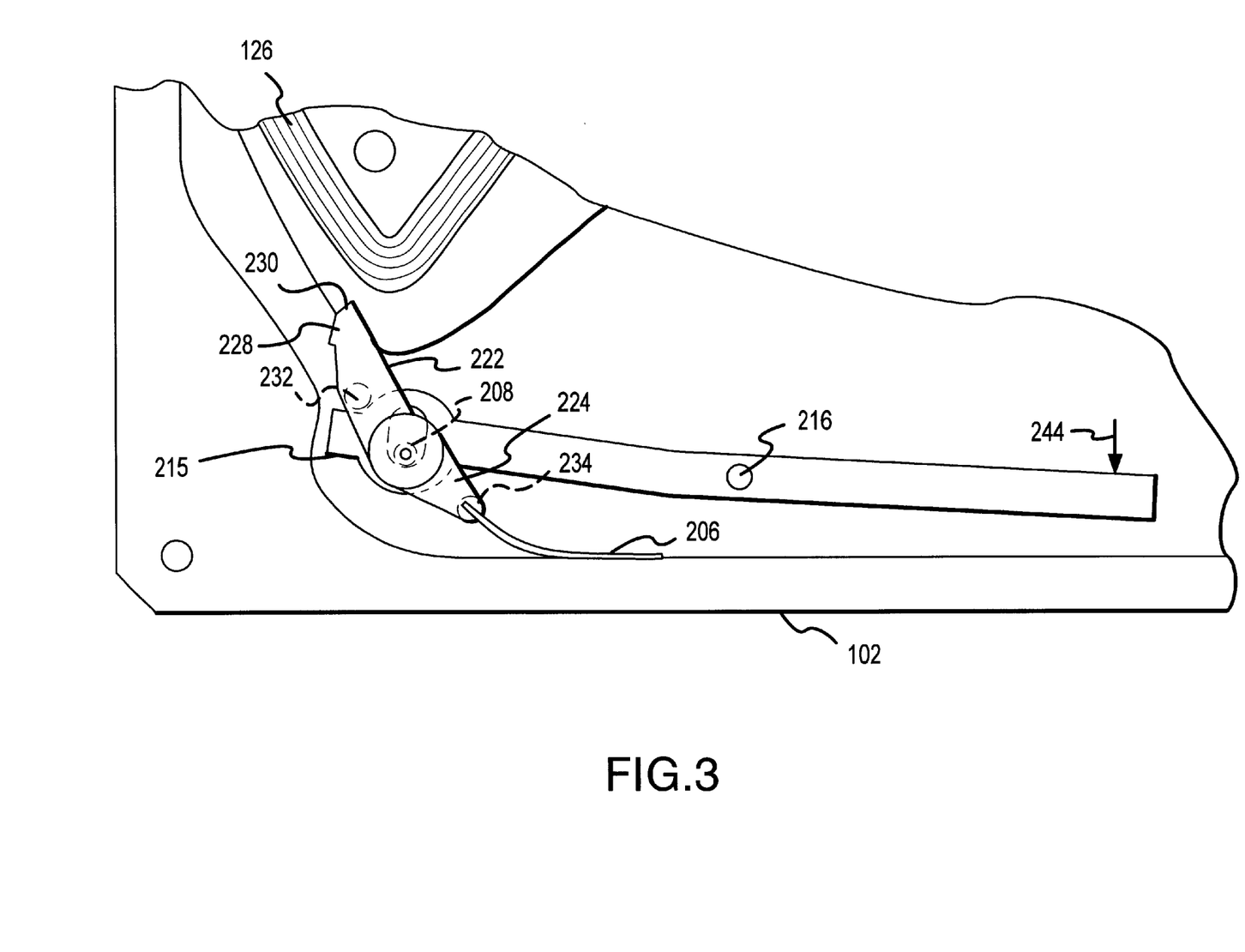
FIG. 3 is an enlarged partial plan view as in FIG. 2 showing the orientation of the latch apparatus in accordance with the first embodiment of the present invention under a shock load applied in one direction.

Referring now to FIG. 3, the assembled latch apparatus 200 in accordance with the first embodiment of the present invention is shown during a rotary shock load directed upwardly in FIG. 3. This load results in a clockwise rotation of the inertial beam 204 indicated by the arrow 244 to the position shown in FIG. 3. This clockwise rotation causes the tab 215 at the distal end of the inertial beam 204 to move upward, engaging the peg 232 to counter the bias provided by the spring 206 and rotate the latch member 202 clockwise. This movement positions the tip 228 into interference engagement with the notch 230 as shown in FIG. 3 to prevent any rotation of the actuator arm 114 away from the latched park position on the ramp 120 shown in FIG. 1.

Figure 4:
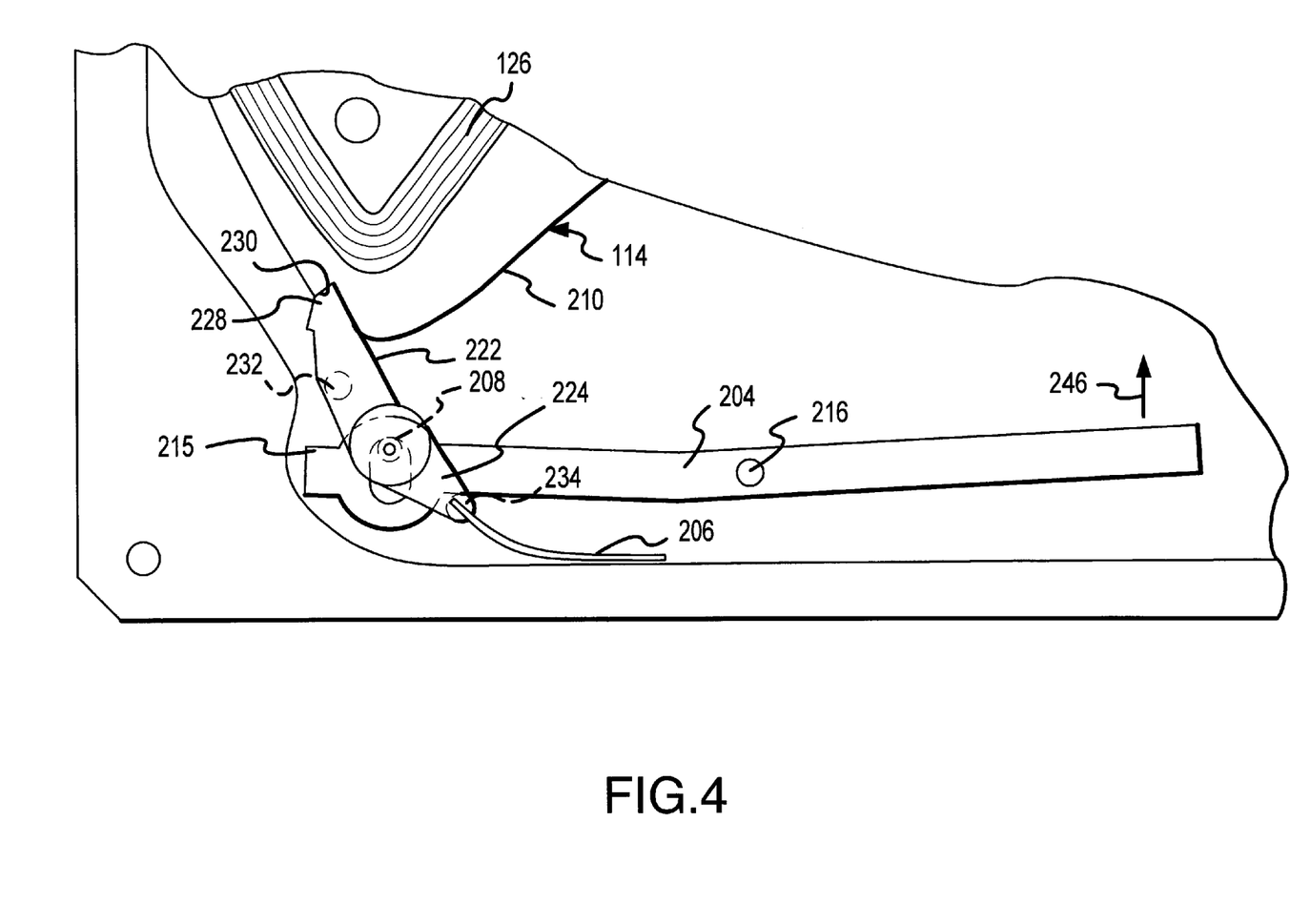
FIG. 4 is an enlarged partial plan view as in FIG. 2 showing the orientation of the latch apparatus in accordance with the first embodiment of the present invention under a shock load applied in an opposite direction to that shown in FIG. 3.
Figure 5:
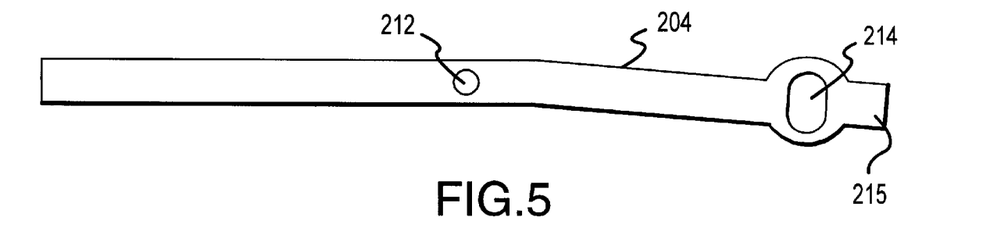
FIG. 5 is a separate plan view of the inertial driver member of the latch apparatus in accordance with the first embodiment of the present invention.

Conversely, referring now to FIG. 4, when a downwardly directed rotary shock load is externally applied to the drive 100, the inertial beam 204 rotates counterclockwise as shown by the arrow 246 to the position shown in FIG. 4. In this case, the opposite end of the inertial beam 204 moves downward such that the peg 234 engages the beam 204 to rotate the latch member 202 clockwise about the pivot pin 208, again engaging the latch tip 228 with the notch 230 in the coil overmold 210 to prevent any rotation of the actuator arm 214 away from the latched park position with the heads 118 on the ramp 120.

Thus it can be seen that whenever the drive 100 is subjected to a shock load with a horizontal component, i.e., directed to the left or right in the plan view of FIG. 1, such as when a rotational shock load is applied about an axis parallel to the actuator axis, the inertial latch 202 will be rotated clockwise, regardless of the direction of the horizontal component of the load. Consequently, when the drive is deenergized and the actuator is parked, the latch 202 will engage the notch 230 to prevent any rotation of the actuator 114 and thus ensure that the heads 118 remain safely parked when the drive 100 is subjected to an external shock. In this embodiment 200, the spring 206 is preassembled onto the latch member 202. The inertial beam is placed on the pin 216 and over the pin 208 on the baseplate. The latch member 202 is then installed over the guide aperture 214 in the beam 204 and onto the pin 208 such that the pegs 232 and 234 straddle the inertial beam 204. The spring 206 is biased against a feature in the wall of the baseplate 202 to complete the assembly.

Referring now to FIGS. 8 through 11, another embodiment 300 of the inertial latch apparatus of the present invention is shown. Like component identification numerals will be utilized for like components wherever possible for this explanation. However, in this embodiment, the components of the latch apparatus may be separately assembled into a module for later drop-in installation in a disc drive 100. The disc drive 100 is again shown in FIG. 8 in a plan view, except this time the discs 108, the drive motor 106, and the flex circuit have been removed for clarity, and the inertial latch apparatus 300 installed alongside the left end wall of the baseplate 102 of the drive 100.

In the embodiment 200 described previously, the latch member and the inertial beam member both rotated about vertical pins projecting from the baseplate 102. However, in this embodiment of the latch apparatus 300, the inertial beam member rotates about a vertical pin and the hatch member rotates about an orthogonal axis, i.e. the latch member rotates in a vertical plane, and the apparatus 300 may be assembled and installed in the drive 100 as an assembled module thus reducing the number of final drive assembly steps.

Figure 9:
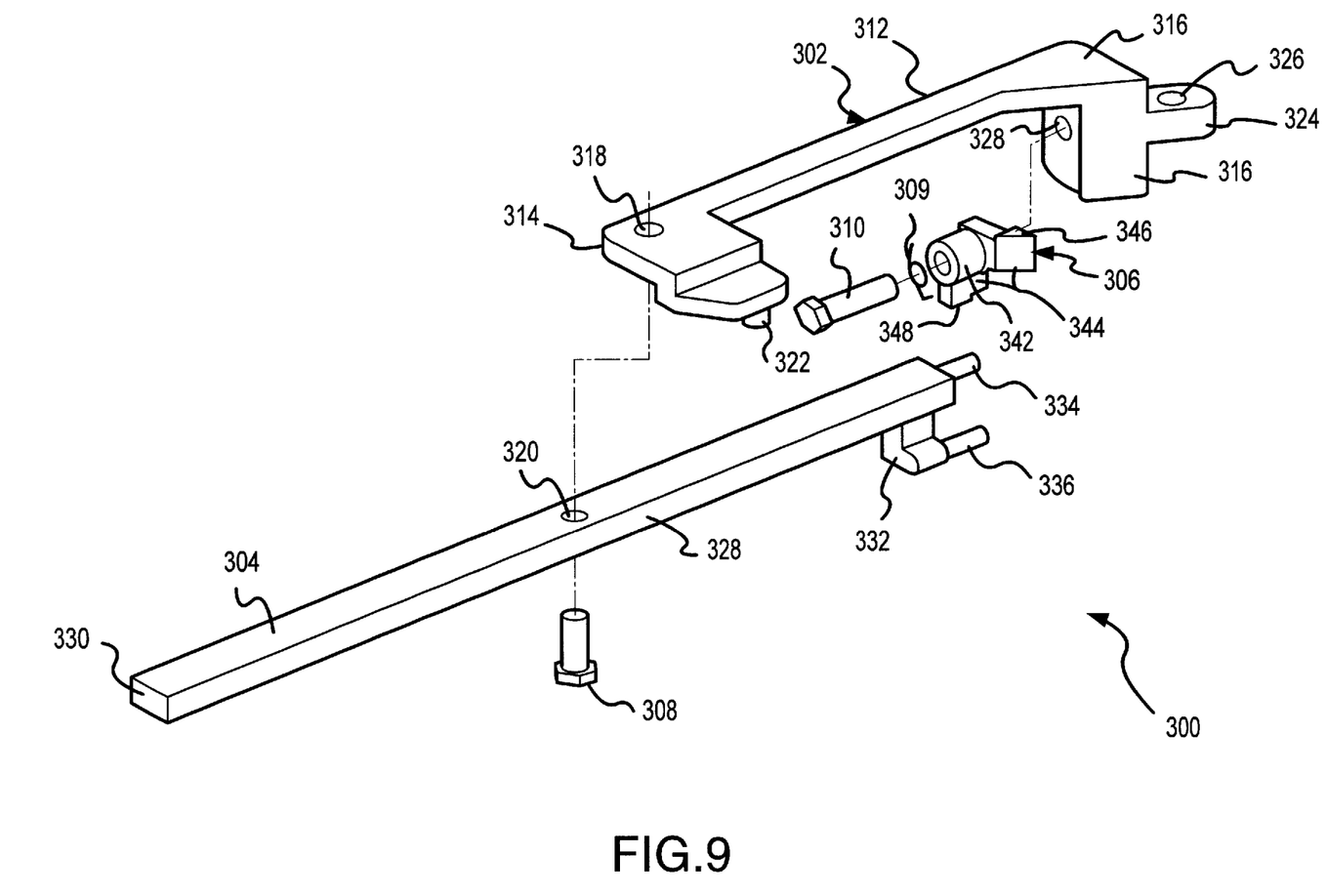
FIG. 9 is an exploded perspective view of the second embodiment of the inertial latch apparatus in accordance with the present invention prior to installation in the disc drive.
Figure 10:
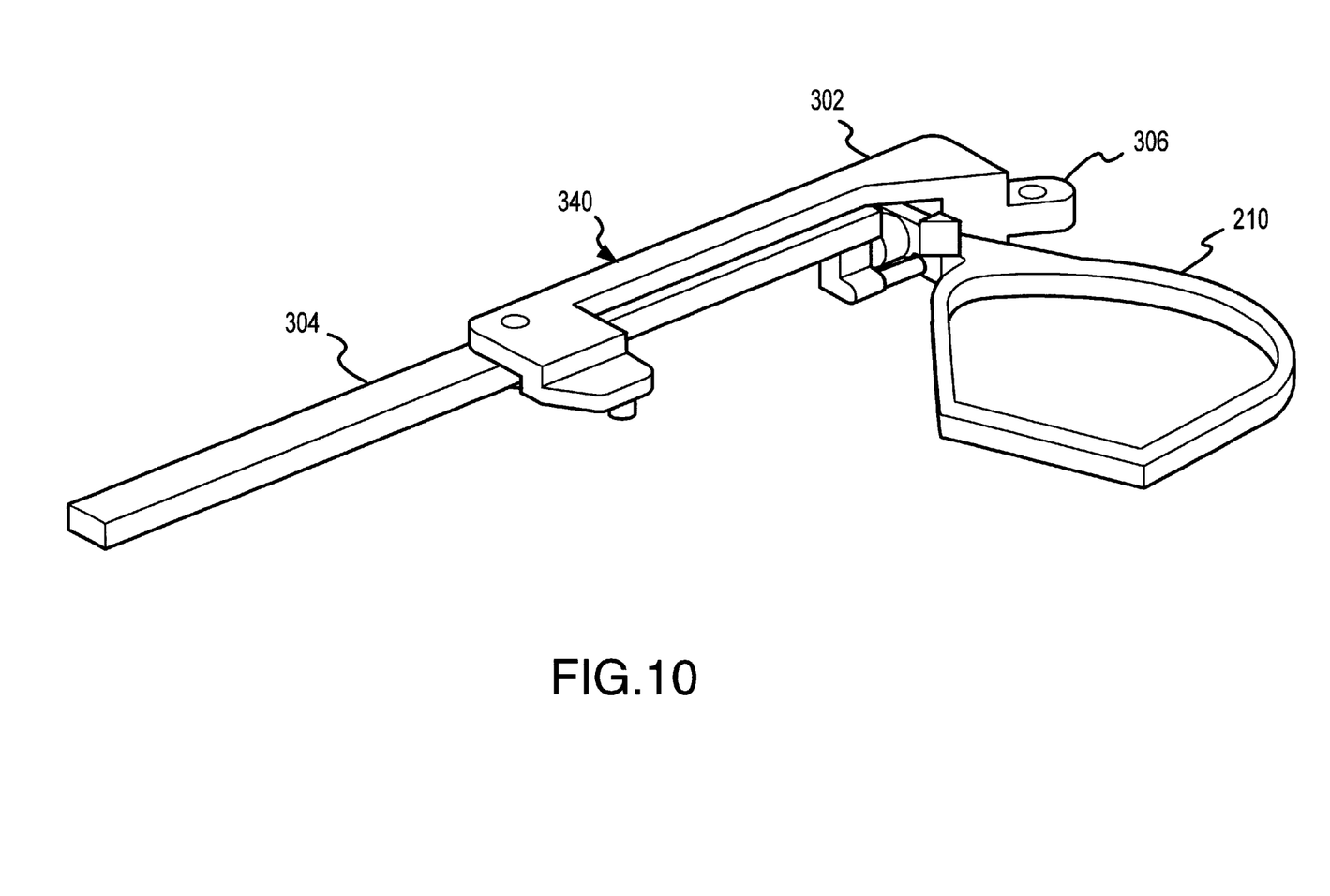
FIG. 10 is an assembled perspective view of the second embodiment shown in FIG. 9 shown in operative relation to the actuator coil overmold which is engaged by the latch apparatus when inertially loaded.

Referring now to the exploded view of the latch apparatus 300 shown in FIG. 9, the apparatus 300 comprises a bracket 302, an inertial beam 304, a latch member 306, a beam pivot pin 308, a spring 309 and a latch pivot pin 310 assembled together as shown by the dotted lines in FIG. 9, to form an assembly that, when installed on the baseplate 102, is positioned proximate the coil overmold 210 as is shown in FIG. 10.

Referring again to FIG. 9, the bracket 302 is an elongated, preferably injection molded plastic body having an elongated flat central portion 312, an inertial beam support end portion 314 at one end of the central portion 312, and a latch support portion 316 at the other end of the central portion 312. The end portion 314 is a generally flat plate with an aperture 318 which receives the beam pivot pin 308. The pivot pin 308 is positioned through a pivot hole 320 in the inertial beam 304 and is then secured to the bracket end 314 via threading, staking or otherwise bonding the pin 308 in the aperture 318. The bracket end 314 also has a downwardly projecting aligning pin 322 offset from the aperture 318 which fits into a corresponding boss or recess (not shown) in the baseplate 102 to fix the orientation of the inertial beam support end 314 of the bracket 302 on the baseplate 102.

The other end of the central portion 312 ends in a widened latch support portion 316. The latch support portion 316 may be a generally rectangular plate portion extending downward at a right angle from the central portion 312 and terminates in a mounting tab 324 bent a right angle to the latch support portion 316 and which extends parallel to the central portion 312. The mounting tab 324 has an aperture 326 for receiving a mounting screw fastened to the baseplate 102 to fasten the support bracket 302 in place. The latch support portion 316 has a central bore 328 through it which receives an end of the latch pivot pin 310. The pin 310 is secured into the latch support portion 316 by threads, press fit, adhesive bonding or other means to fasten the pin 310 and support portion 316 together. The latch pin is first assembled first through the spring 309 and then through the latch member 306 and into the bore 328 such that the latch member 306 is free to rotate about the fixed pin 310.

The inertial beam 304 is an elongated generally flat bar member made of plastic or metal. The beam 304 has a flat pivot portion 328 having a pivot hole 320 spaced between a flat free end 330 of the beam 304 and a latch engaging end 332. The latch engaging end 332 extends downward at a right angle from the pivot portion 328 and has two cylindrical pins or pegs 334 and 336 which project outward at a right angle from the latch engaging end 332 and extend parallel to the flat pivot portion 328. These pins 334 and 336 straddle the latch pivot pin 310 into an assembled latch module 340 as shown in FIG. 10.

The latch member 306 is preferably an injection molded plastic body have a generally cylindrical central portion 342 with a central through bore 344 for receiving pivot pin 310, a latch portion 346 offset from the through bore 344 extending from the central portion 342 at a right angle to the axis of the through bore 344. The latch member 306 also has an engagement tab 348 in the plane of the latch portion 346 oppositely offset from the bore 344 and extending from the central portion 342 at a right angle to the latch portion 346. The latch member 306 is assembled to the bracket 302 by passing the latch pin 310 through the spring 309, through the through bore 344 and into the bore 328. Thus assembled, the inertial beam 304 is then positioned against the underside of the bracket 302 with the pegs 334 and 336 straddling the latch portion of the latch member 306 with the pin 310 centered between them.

Figure 11:
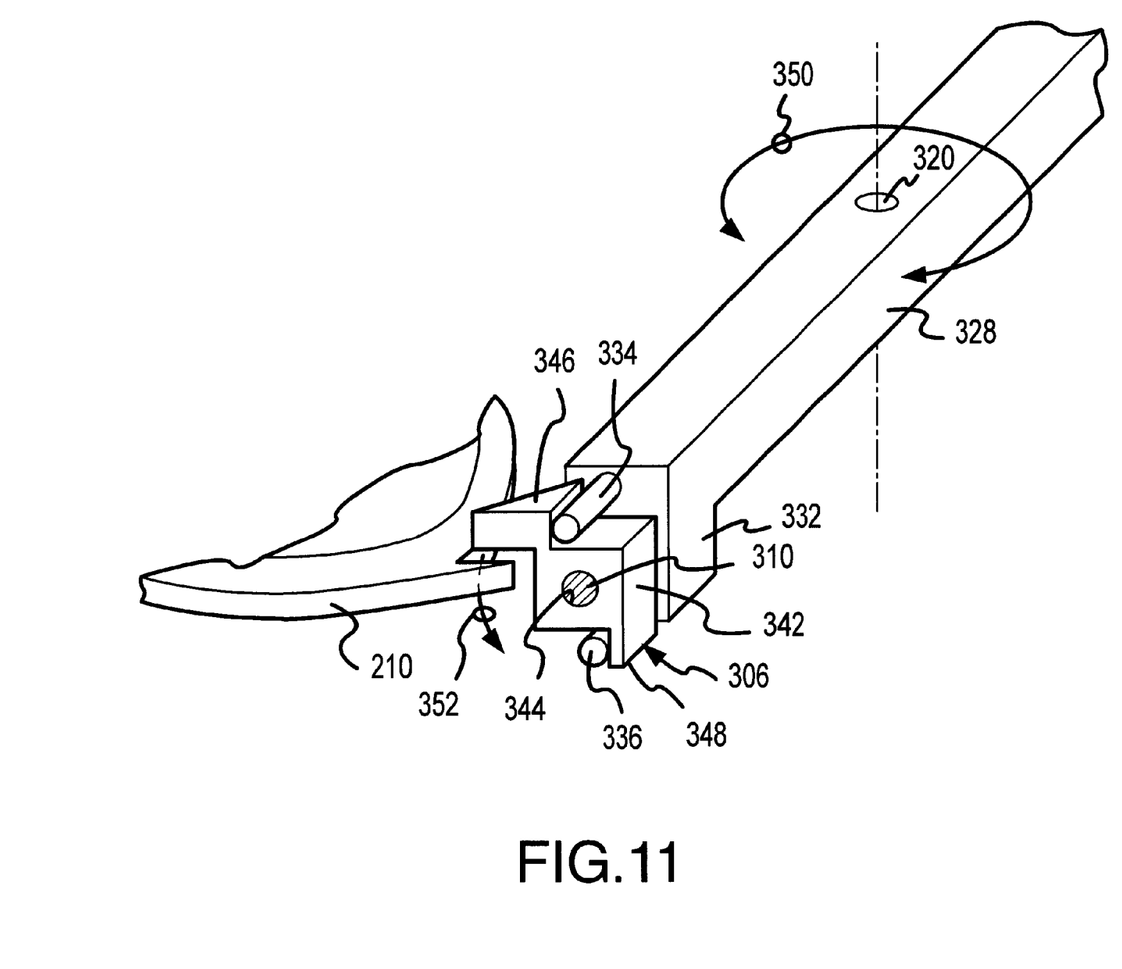
FIG. 11 is a simplified end perspective view of the inertial latch apparatus of the second embodiment shown in FIG. 10 illustrating that inertial movement of the beam end either clockwise or counterclockwise about its vertical axis results in counterclockwise rotation of the latch member about its horizontal axis into engagement with the actuator coil overmold.

Referring now to FIG. 11, a simplified perspective latch end view of the inertial latch apparatus 300 is shown. If an inertial force is exerted on the inertial beam 304 so as to cause clockwise rotation of the beam 304 as shown by arrow 350, the upper peg 334 will move to the left and push against the rear face of the latch portion 346 thus causing counterclockwise vertical rotation of the latch member 306 as shown by arrow 352 into an interference engagement with the coil form 210 of the actuator 114. In contrast, if an inertial force is exerted on the inertial beam 304 so as to cause counterclockwise rotation of the beam 304 as shown by the direction of arrow 350, the lower peg 336 of the beam 304 will engage the engagement tab 348 on the latch member 306 to again cause counterclockwise rotation of the latch member 306 as shown by the direction of arrow 352 into interference engagement with the coilform 210. The spring 309 is positioned between the bracket 312 and the latch member 306 so as to provide a clockwise rotational bias on the latch member 306 during static conditions. Thus this embodiment 300 again provides an inertial latch that operates within the confined space of the disc drive without usurping significant space within the head disc assembly and which operates whenever there is a rotational shock load applied, i.e., having a horizontal component of shock force applied, either directed to the left or right in the plan view of FIG. 8, to the drive during external impacts or other abrupt movements of the drive.

All of the components of the embodiments of the present invention, with the exception of the spring 309, may be made of metal, plastic, or other suitable materials. The spring are preferably made of spring steel or other suitable metal. In either embodiment, a wire spring may be used or a flat strip spring may be used instead of the exemplary springs shown. The shapes of the inertial beam and the latch member may also be other than as specifically shown and described.

In summary, the present invention is an inertial latch apparatus (such as 200 or 300) for maintaining an actuator arm (such as 114) in a disc drive (such as 100) in a predetermined position, the drive having a baseplate (such as 102), one or more data storage discs (such as 108), a spin motor (such as 106) mounted to the baseplate for rotating the data disc, an actuator assembly (such as 110) supported from the baseplate positioned adjacent the data disc (such as 108) for rotating the actuator arm (such as 114) in a plane parallel to a plane of rotation of the data disc (such as 108) and positioning the actuator arm (such as 114) over a surface of the data disc. The inertial latch apparatus (such as 200 or 300) has an elongated inertial beam member (such as 204 or 304) pivotally mounted in the disc drive for rotation in a plane parallel to the plane of rotation of the actuator arm (such as 114) and a latch member (such as 202 or 306) pivotally mounted in the disc drive for rotation between a disengaged position ( such as is shown in FIG. 2) permitting movement of the actuator arm (114) when the latch member (such as 202 or 306) is in the disengaged position and an engaged position (such as is shown in FIGS. 3 and 4) in interference relation to a portion (such as 230 in 210) of the actuator arm (such as 114) to prevent movement of the actuator arm, wherein the latch member rotation in one direction occurs in response to rotation of the beam member (such as 204 or 304) in either a clockwise or counterclockwise direction from a neutral position.

The inertial latch apparatus (such as 200 or 300) preferably has the latch member (such as 202 or 306) biased to the disengaged position. The latch member (such as 202) and inertial beam member (such as 204) are mounted on pivot pins (such as 208 and 216) fastened to the baseplate (such as 102) of the disc drive (such as 100) in one embodiment of the present invention. In another embodiment of the invention, the latch member (such as 306) and inertial beam member (such as 304) are mounted on pivot pins with one of the pivot pins (such as 308) oriented parallel to the axis of disc rotation. In this alternative only one pivot pin (such as 308) is parallel to the axis of disc rotation. The other pivot pin (such as 310) is perpendicular to the pivot pin 308. Thus the pivot pins (such as 308 and 310) are mounted orthogonal to each other. In this embodiment of the invention, both pivot pins (such as 308 and 310) are fastened to a bracket (such as 302) fastened to the baseplate (such as 102).

In one embodiment of the apparatus in accordance with the invention, the latch member (such as 202) has a central bore (such as 226) receiving one of the pivot pins (such as 208) and has a pair of spaced pegs (such as 232 and 234) projecting from an underside of the latch member (such as 202) parallel to the central bore (such as 226) so as to straddle an end portion (such as 215) of the inertial beam member (such as 204) installed beneath the latch member on the one pivot pin (such as 208). These pegs (such as 232 and 234) are aligned with the central bore (such as 226) so that they sandwich the beam (such as 204) between them.

In another embodiment (such as 300) the inertial beam member (such as 304) has an elongated portion rotatably fastened to one end (such as 314) of the bracket (such as 302) by one pivot pin (such as 308). The latch member (such as 306) is mounted by the other pivot pin (such as 310) to an opposite end (such as 316) of the bracket (such as 302). The inertial beam member (such as 304) has an end portion (such as 332) extending generally perpendicular to the elongated portion. The end portion (such as 332) of the inertial beam has a pair of spaced pegs (such as 334 and 336) projecting from the end portion (such as 332) parallel to the elongated portion (such as 328) so as to straddle the latch member (such as 306) pivot pin (such as 310) in the bore (such as 344) through the central portion (such as 342). The latch member (such as 306) comprises a cylindrical central portion (such as 342) which has an axial bore (such as 344) receiving the latch member pivot pin (such as 310). The latch member also has a latch portion (such as 346) extending from the central portion at an angle to the axial bore, and an engagement tab (such as 348) extending from the central portion (such as 342) at a right angle to the latch portion (such as 346). The pegs (such as 334 and 336) of the inertial beam (such as 304) straddle the central portion (such as 342) of the latch member (such as 306) when the latch member and inertial beam are assembled to the bracket (such as 302) such that both clockwise and counterclockwise rotation of the beam (such as 304) in its plane of rotation causes only clockwise rotation of the latch member in a perpendicular plane to the plane of rotation of the beam.

Thus, generally, the present invention may be viewed as a disc drive (such as 100) having a baseplate (such as 102), a data disc (such as 108) rotatably supported by a spin motor (such as 106) mounted to the baseplate, and an actuator assembly (such as 110) mounted to the baseplate for rotation of an actuator (such as 114) over a portion of the disc, wherein the drive has an inertial latch assembly (such as 200 or 300) fastened to the baseplate. The latch assembly has an elongated inertial beam member (such as 204 or 304) cooperating with a latch member (such as 202 or 306) to interfere with rotation of the actuator (such as 114), e.g. the coil overmold (such as 210) when the drive (such as 100) is subjected to an external shock load from any direction having a horizontal component of force, e.g., a rotational shock load about an axis parallel to the actuator axis.

The latch member (such as 202 and 306) in each embodiment is rotatably mounted on a pivot pin (such as 208 or 310) and the beam member (such as 204 or 304) is mounted on another pivot pin (such as 216 or 308). The beam member (such as 304) in one embodiment (such as 300) has a pair of pegs (such as 334 and 336) projecting from one end engaging the latch member (such as 306). In this embodiment, the inertial beam member pivot pin (such as 308) is fastened to one end portion of the bracket (such as 302) and the latch member pivot pin (310) is fastened to an opposite end portion of the bracket for rotation of the latch member (such as 306) about an axis perpendicular to an axis of the beam member pivot pin (such as 308). The pivot pins (such as 308 and 310) are both fastened to an elongated bracket (such as 302) and thus the assembly (such as 300) may be built up separate from the disc drive and then installed as a unit or module onto the baseplate 102, for example, by bolting the assembly to the baseplate (such as 102).

In the other embodiment, the latch member (such as 202) is rotatably mounted on a pivot pin (such as 208) and the beam member (such as 204) is mounted on another pivot pin (such as 216). The beam member has one end (such as 215) engaging one of a pair of pegs (such as 232 and 234) which project from the latch member to rotate the latch member (as shown in FIG. 3) into engagement with the coil overmold (such as 210) of the actuator (such as 114) when the disc drive is subjected to an external shock. This movement into engagement occurs regardless of the direction of rotation of the beam member (such as 204). In this embodiment the pivot pins (such as 208 and 216) are both fastened directly into the baseplate and thus extend parallel to the axes of rotation of both the actuator (such as 114) and the disc motor (such as 106).

It will be clear that the present invention is well adapted to attain the ends and advantages mentioned as well as those inherent therein. While two preferred embodiments have been described for purposes of this disclosure, numerous other changes may be made which will readily suggest themselves to those skilled in the art For example, the inertial beams in both embodiments may have a different than that shown. For example, the length of the beam may be shortened and widened as needed for space considerations. Accordingly, all such modification, changes and alternatives are encompassed in the spirit of the invention disclosed and as defined in the appended claims.

What is claimed is:

1. An inertial latch apparatus for maintaining an actuator arm in a disc drive in a predetermined position, the drive having a baseplate, a data storage disc, a spin motor mounted to the baseplate for rotating the data disc, an actuator assembly supported from the baseplate positioned adjacent the data disc for rotating the actuator arm in a plane parallel to a plane of rotation of the data disc and positioning the actuator arm over a surface of the data disc, the inertial latch apparatus comprising:

an elongated inertial beam member pivotally mounted in the disc drive for rotation in a plane parallel to the plane of rotation of the actuator arm; and a latch member for preventing movement of the actuator arm from the predetermined position when the disc drive is subjected to an external shock load, the latch member being pivotally mounted in the disc drive for rotation between a disengaged position permitting movement of the actuator arm when the latch member is in the disengaged position and an engaged position in interference relation to a portion of the actuator arm to prevent movement of the actuator arm from the predetermined position, wherein latch member rotation in one direction occurs in response to rotation of the beam member in either a clockwise or counterclockwise direction from a neutral position, and wherein only one of the beam member or the latch member pivots about an axis that is parallel to the axis of disc rotation.

2. The apparatus according to claim 1 wherein the latch member is biased to the disengaged position.

3. The apparatus according to claim 1 wherein the latch member and the inertial beam member are mounted on pivot pins and the pivot pins are mounted orthogonal to each other.

4. The apparatus according to claim 3 wherein both pivot pins are fastened to a bracket fastened to the baseplate.

5. The apparatus according to claim 4 wherein the inertial beam member has an elongated portion rotatably fastened to one end of the bracket by one pivot pin and the latch member is mounted by the other pivot pin to an opposite end of the bracket.

6. The apparatus according to claim 5 further comprising the inertial beam member having an end portion extending generally perpendicular to the elongated portion, the end portion of the inertial beam having a pair of spaced pegs projecting from the end portion parallel to the elongated portion so as to straddle the latch member pivot pin.

7. The apparatus according to claim 6 wherein the latch member comprises a cylindrical central portion having an axial bore receiving the latch member pivot pin, a latch portion extending from the central portion at an angle to the axial bore, and an engagement tab extending from the central portion at a right angle to the latch portion, the pegs straddling the central portion of the latch member such that clockwise and counterclockwise rotation of the beam in its plane of rotation causes rotation of the latch member in a perpendicular plane so as to engage a portion of the actuator arm to prevent rotation of the actuator arm from the predetermined position during in inertial event.

8. A disc drive having a baseplate, a data disc rotatably supported by a spin motor mounted to the baseplate, and an actuator assembly mounted to the baseplate for rotation of an actuator over a portion of the disc, the drive comprising:

an inertial latch assembly fastened to the baseplate, the inertial latch assembly having an elongated inertial beam member mounted for rotation about a first axis and a latch member mounted for rotation about a second axis orthogonal to the first axis, the inertial beam cooperating with the latch member to interfere with rotation of the actuator when the drive is subjected to an external shock load from any direction having a horizontal component of force.

9. The disc drive according to claim 8 wherein the beam member includes a pair of elongated pegs projecting from one end to engage the latch member.

10. The disc drive according to claim 8 wherein the latch member is rotatably mounted on a first pivot pin and the beam member is rotatably mounted on a second pivot pin, wherein the first and second pivot pins are both fastened to an elongated bracket.

11. The disc drive according to claim 10 wherein the inertial latch assembly is assembled as a unit separate from the baseplate and the bracket is secured to the baseplate.

12. The disc drive according to claim 11 wherein the beam pivot pin is fastened to one end portion of the bracket and the latch pivot pin is fastened to an opposite end portion of the bracket.

13. An inertial latch apparatus for use in a disc drive having a baseplate and a data disc mounted on a spin motor on the baseplate for rotation about a spin axis and an actuator assembly mounted on the baseplate for rotation of an actuator about an axis parallel to the spin axis, the apparatus comprising:

a latch member movable between a position engaging the actuator and a disengaged position permitting rotation of the actuator; and means for moving the latch member from the disengaged position to the engaged position when the disc drive is subjected to an external shock load having a horizontal component of force.

14. An inertial latch apparatus for maintaining an actuator arm in a disc drive in a predetermined position, the drive having a baseplate, a data storage disc, a spin motor mounted to the baseplate for rotating the data disc, an actuator assembly supported from the baseplate positioned adjacent the data disc for rotating the actuator arm in a plane parallel to a plane of rotation of the data disc and positioning the actuator arm over a surface of the data disc, the inertial latch apparatus comprising:

an elongated inertial beam member rotatably mounted on a first pivot pin for rotation in a plane parallel to the plane of rotation of the actuator arm, wherein one end of the elongated inertial beam includes a guide aperture surrounding a second pivot pin; and a latch member for preventing movement of the actuator arm from the predetermined position when the disc drive is subjected to an external shock load, the latch member rotatably mounted above the elongated inertial beam on the second pivot pin for rotation between a disengaged position permitting movement of the actuator arm when the latch member is in the disengaged position and an engaged position in interference relation to a portion of the actuator arm to prevent movement of the actuator arm from the predetermined position, wherein latch member rotation in one direction occurs in response to rotation of the beam member in either a clockwise or counterclockwise direction from a neutral position.

15. The apparatus according to claim 14 wherein the latch member is biased to the disengaged position.

16. The apparatus according to claim 14 wherein the latch member has a central bore receiving the second pivot pin and has a pair of elongated pegs projecting from an underside of the latch member, the elongated pegs extending parallel to the central bore to straddle the end of the inertial beam member adjacent to the guide aperture.

17. The apparatus according to claim 16 wherein the pair of elongated pegs are aligned with the central bore.

18. The apparatus according to claim 14 wherein the latch member has a latch tip at one end for engaging a corresponding notch in the actuator assembly to interfere with movement of the actuator arm.

* * * * *